(12) United States Patent
Eulitz et al.

(10) Patent No.: US 11,964,556 B2
(45) Date of Patent: Apr. 23, 2024

(54) BATTERY UNIT AND HYBRID VEHICLE WITH A BATTERY UNIT

(71) Applicant: KAUTEX TEXTRON GMBH & CO. KG, Bonn (DE)

(72) Inventors: Dirk Eulitz, Bonn (DE); Klaus Gebert, Willich (DE); Harald Lorenz, Kirchdaun (DE); Daniel Marx, Bedburg (DE); Fabian Siggia, Cologne (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 373 days.

(21) Appl. No.: 17/297,739

(22) PCT Filed: Nov. 26, 2019

(86) PCT No.: PCT/EP2019/082513
§ 371 (c)(1),
(2) Date: May 27, 2021

(87) PCT Pub. No.: WO2020/109273
PCT Pub. Date: Jun. 4, 2020

(65) Prior Publication Data
US 2022/0041052 A1 Feb. 10, 2022

(30) Foreign Application Priority Data
Nov. 30, 2018 (DE) ...................... 10 2018 130 506.0

(51) Int. Cl.
*B60K 15/04* (2006.01)
*B60K 15/067* (2006.01)
(Continued)

(52) U.S. Cl.
CPC ............ *B60K 15/067* (2013.01); *B60L 50/66* (2019.02); *B60K 2015/0634* (2013.01); *B60Y 2200/92* (2013.01)

(58) Field of Classification Search
CPC .... B60K 15/067; B60K 15/07; B60K 15/073; B60K 15/063; B60K 2015/0634; B60L 50/66; B60L 60/66
See application file for complete search history.

(56) References Cited

U.S. PATENT DOCUMENTS

| 8,919,472 | B2 * | 12/2014 | Magens | .................. B60L 50/66 180/68.5 |
| 2006/0162973 | A1 * | 7/2006 | Harris | ................. B66F 9/07531 307/66 |

(Continued)

FOREIGN PATENT DOCUMENTS

| DE | 10 2005 052 586 A1 | 5/2006 |
| DE | 102010007414 A1 | 8/2011 |

(Continued)

OTHER PUBLICATIONS

International Preliminary Report on Patentability dated Jun. 17, 2021 in PCT Application No. PCT/EP2019/082513.

*Primary Examiner* — John D Walters
(74) *Attorney, Agent, or Firm* — Occhiuti & Rohlicek LLP

(57) ABSTRACT

The subject matter of the invention is a battery unit (100) for a hybrid vehicle (200), with a battery housing (10) which has a front side wall (23) directed towards the front side (22) of the hybrid vehicle (200) and a rear side wall (24) directed towards the rear side of the hybrid vehicle (200), and with at least one battery module (11) which is arranged in the battery housing (10), wherein at least one fuel tank (12) is arranged in the battery housing (10).

14 Claims, 2 Drawing Sheets

(51) Int. Cl.
    *B60L 50/60*     (2019.01)
    *B60K 15/063*    (2006.01)

(56)               References Cited

U.S. PATENT DOCUMENTS

| | | | |
|---|---|---|---|
| 2011/0068622 | A1 | 3/2011 | Ikeno et al. |
| 2017/0106992 | A1 | 4/2017 | Hemingway |
| 2019/0202500 | A1* | 7/2019 | Montgomery ......... B62D 21/16 |
| 2019/0280259 | A1* | 9/2019 | Bruns ................ B65D 81/3813 |

FOREIGN PATENT DOCUMENTS

| | | |
|---|---|---|
| DE | 10 2012 210 967 A1 | 1/2013 |
| DE | 102012022346 A1 | 5/2014 |
| DE | 10 2014 118 654 A1 | 6/2016 |
| EP | 3012190 A1 | 4/2016 |
| FR | 2976252 A1 | 12/2012 |
| JP | 2005116358 A | 4/2005 |
| JP | 2007179775 A | 7/2007 |
| JP | 2007294293 A | 11/2007 |
| JP | 2007320331 A | 12/2007 |
| JP | 2008155880 A | 7/2008 |
| JP | 2011111124 A | 6/2011 |
| JP | 2014058249 A | 4/2014 |
| JP | 5619304 B1 | 11/2014 |
| JP | 2016052862 A | 4/2016 |
| WO | 0179012 A2 | 10/2001 |
| WO | 2018047677 A1 | 3/2018 |
| WO | 2018138717 A1 | 8/2018 |

\* cited by examiner

BATTERY UNIT AND HYBRID VEHICLE WITH A BATTERY UNIT

CROSS-REFERENCE TO RELATED APPLICATIONS

This application is a national phase under 35 U.S.C. 371 of International Application No. PCT/EP2019/082513 filed on Nov. 26, 2019, which claims priority to German Application No. 10 2018 130 506.0 filed on Nov. 30, 2018, the contents of all of which are hereby incorporated by reference in their entireties.

The invention relates to a battery unit for a hybrid vehicle, which battery unit has a battery housing which has a front side wall directed towards the front side of the hybrid vehicle and a rear side wall directed towards the rear side of the hybrid vehicle, and has at least one battery module arranged in the battery housing. The invention also relates to a hybrid vehicle comprising such a battery unit.

Hybrid vehicles generally have both an internal combustion engine and an electric motor for driving the motor vehicle. For driving using fuel, a fuel tank is arranged in the motor vehicle, in which tank the liquid fuel is stored and from which tank the liquid fuel is fed to the internal combustion engine. For electric driving, a battery unit which is arranged in addition to and separately from the fuel tank is usually provided in the motor vehicle and has one or more battery modules in which electrical energy is stored. In such a hybrid vehicle, the configuration of the chassis is very complex and difficult, since both drive concepts have to be accommodated in the chassis. Up to now, the two drive concepts have been arranged completely separately from one another in the chassis, the chassis mostly being used for the purely internal combustion engine drive and the battery unit being integrated into this chassis in a complex manner and at high cost.

The invention is based on the object of providing a battery unit and a hybrid vehicle by means of which the integration of both drive concepts of a hybrid vehicle in a chassis of the hybrid vehicle can be simplified.

According to the invention, this object is achieved by the features of the independent claims. Expedient embodiments and advantageous developments of the invention are specified in the dependent claims.

The battery unit according to the invention is characterized in that at least one fuel tank is arranged in the battery housing.

According to the invention, the fuel tank in which the fuel for the internal combustion engine drive of the hybrid vehicle is stored is now to also be integrated into the battery housing of the battery unit. The battery modules and the fuel tank are thus arranged in the same housing, namely the battery housing. A particularly space-saving arrangement of the electric drive together with the internal combustion engine drive is thus possible. In addition, the fuel tank and the battery unit no longer have to be arranged separately from one another on the chassis of the hybrid vehicle, but instead the fuel tank and the battery unit can be arranged as one unit on the chassis, so that the effort involved in integrating the two drive concepts in one chassis can be significantly reduced. As a result, the safety measures can be significantly reduced, since the fuel tank is also protected by the battery housing, which is usually very stable. The battery housing is preferably designed in such a way that it completely encloses the fuel tank together with the battery modules. The battery modules and the fuel tank are preferably arranged next to one another in the battery housing.

One or more battery modules can be arranged in the battery housing. Furthermore, one or more fuel tanks can also be arranged in the battery housing.

Because the fuel tank is now protected by the battery housing, the at least one fuel tank can be made from a plastics material. The fuel tank is preferably already protected by the battery housing which is specially designed to protect against damage in the event of the hybrid vehicle being involved in an accident, so that in particular a plastics material which has a lower cold impact strength can be used for the fuel tank. For example, polyphthalamides (PPA), polyketones, polyphenylene sulfide (PPS), polyoxymethylene (POM) and/or polyamide (PA) can be used as the plastics material for the fuel tank.

Because it is possible to use a thermoplastic material for the fuel tank, the at least one fuel tank can preferably be produced in an injection molding process. The fuel tank can thereby be produced with reduced effort and lower costs. In addition, wall thicknesses of the fuel tank that are particularly optimized in terms of requirements can be achieved. Furthermore, when an injection molding process is used, further components or functional elements, such as baffles or swirl pots, can even be introduced or integrated into the fuel tank, in particular into the wall of the fuel tank, when the fuel tank is formed. Furthermore, it is also possible for the fuel tank to be manufactured in an injection molding process.

The at least one fuel tank and the one or more battery modules are preferably arranged together in a pack so that they form a unit. For example, the at least one fuel tank can be arranged in a row behind the at least one battery module. This enables a compact arrangement of the fuel tank and battery modules in the battery housing. The one or more fuel tanks and the one or more battery modules can preferably be stacked one behind the other. In order to be able to be integrated into the chassis of the hybrid vehicle in a space-saving manner in particular, the battery housing preferably has a flat, elongate configuration, so that the battery housing is built low. In such a battery housing, the fuel tank and the one or more battery modules can be stacked one behind the other.

It is also possible for battery modules to be stacked one on top of the other. Thus, one or more rows of battery modules can be arranged in the battery housing, in which the battery modules can be arranged so as to be stacked both one behind the other and one on top of the other.

In order to be able to arrange the at least one fuel tank and the one or more battery modules as compactly as possible as a pack, the at least one fuel tank preferably has an outer contour which can be adapted to an outer contour of the at least one battery module. For example, if the outer contour of the battery modules is rectangular, the outer contour of the at least one fuel tank is also rectangular. Due to the mutually adapted outer contour, the fuel tank and battery module can be arranged directly in the battery housing without losing space. The fuel tank can preferably be arranged flat against a battery module.

The at least one fuel tank is preferably designed as a pressure tank. If the fuel tank is designed as a pressure tank, the preferably rigid battery housing can be used to reduce possible deformations of the fuel tank in the event of overpressure. If the fuel tank is designed as a pressure tank, it can preferably be designed for pressures of up to approximately +500 mbar.

To stabilize the fuel tanks, the at least one fuel tank can have one or more indentations formed in the direction of an interior of the fuel tank and/or a plurality of ribs formed on an inside of the fuel tank. The ribs and/or indentations can counteract an underpressure and/or overpressure that occurs in the fuel tank.

In order to be able to achieve pressure equalization in the battery housing in the event of damage to the battery modules and/or the fuel tank in the battery housing, for example in the event of the hybrid vehicle being involved in an accident, for example to achieve pressure equalization when the damaged battery modules and/or the fuel in the damaged fuel tank become heated, the battery housing can have at least one degassing opening. The degassing opening is preferably formed on the front side wall or rear side wall of the battery housing, so that hot gas and possibly flames arising in the gas can be prevented from escaping laterally from the battery housing in the direction of the vehicle doors of the hybrid vehicle. The battery housing preferably has more than one degassing opening through which pressurized air can escape from the battery housing. It is possible to reduce the pressure in the interior of the battery housing in a controlled and efficient manner by means of the degassing opening.

The battery housing preferably has a first degassing opening and a second degassing opening, wherein the first degassing opening can be arranged on the front side wall of the battery housing and the second degassing opening can be arranged on the rear side wall of the battery housing. If a degassing opening is arranged both on the front side wall and on the rear side wall of the battery housing, degassing can take place on two sides of the battery housing. Due to the arrangement of the degassing openings on the front side wall and the rear side wall, it is possible, if the hybrid vehicle overturns in the event of an accident, to prevent fuel that is spreading in the battery housing, if the fuel tank is damaged, from escaping in particular, since the degassing openings do not change their position in relation to their height even if the battery housing overturns together with the hybrid vehicle. This can also prevent gas that is leaking from the battery housing or flames contained in the gas from escaping in the direction of the side doors of the hybrid vehicle, so that even in the event of an accident, the vehicle occupants are protected from the escaping gas and any flames that may arise.

In order to be able to achieve liquid tightness in the region of the degassing opening in addition to pressure equalization, the at least one degassing opening preferably has a semipermeable membrane. The semipermeable membrane can, for example, extend over the entire opening cross-section of the degassing opening in order to close it accordingly to liquids and at the same time open it to gases, such as air. A semipermeable membrane is preferably arranged at each degassing opening.

In order to be able to keep the distance between the fuel tank and an internal combustion engine arranged in the motor vehicle as small as possible, the at least one fuel tank is preferably arranged adjacent to the front side wall. By positioning the fuel tank in this way, the lines between the fuel tank and the internal combustion engine can be made as short as possible. Alternatively, however, it is also possible for the fuel tank to be arranged adjacent to the rear side wall.

It is also preferable that an activated carbon filter is arranged in the battery housing. The activated carbon filter can filter out hydrocarbons. The activated carbon filter is preferably arranged between the fuel tank and a wall, for example the front side wall of the battery housing.

In addition, it is possible for two or more fuel tanks to be arranged in the battery housing, which can be arranged so as to be stacked one behind the other and/or one on top of the other and/or one next to the other. As a result, a compact fuel tank arrangement can be achieved even if there are a plurality of fuel tanks in the battery housing.

The object according to the invention is also achieved by means of a hybrid vehicle which has a battery unit which has been designed and developed as described above. With regard to the advantages of the hybrid vehicle, reference is made to the advantages mentioned for the battery unit.

A tank filler neck which can be connected to the fuel tank in the battery housing of the battery unit via a fuel filler line can preferably be arranged on a fender of a front wheel or a rear wheel of the hybrid vehicle. Such an arrangement of the tank filler neck allows the fuel filler line to be made shorter, since the fuel tank is preferably arranged in the direction of the front side of the hybrid vehicle.

The invention is explained in greater detail in the following with reference to the accompanying drawings using preferred embodiments.

Figure 1:
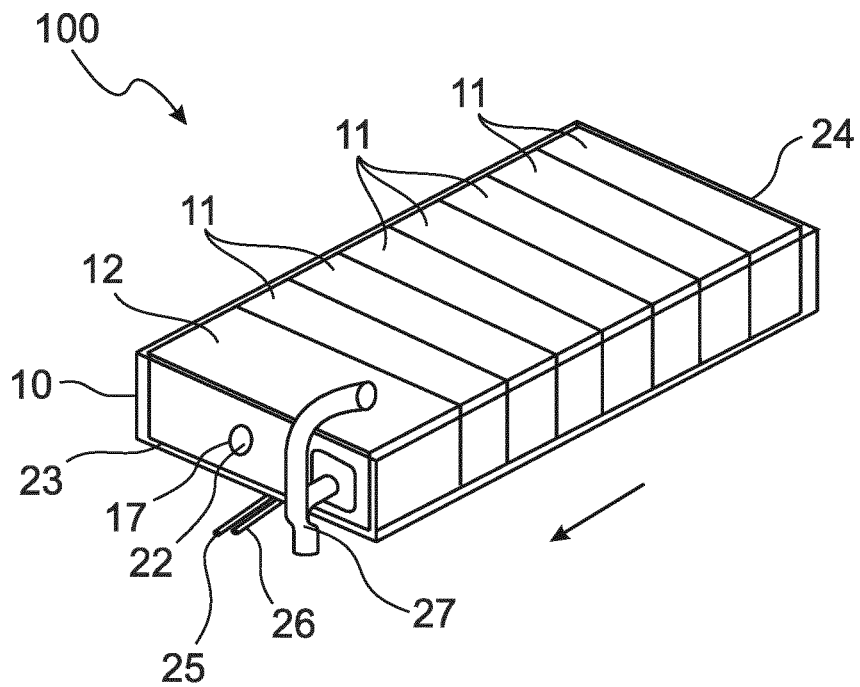
FIG. 1 is a schematic view of a battery unit according to the invention.
Figure 4:
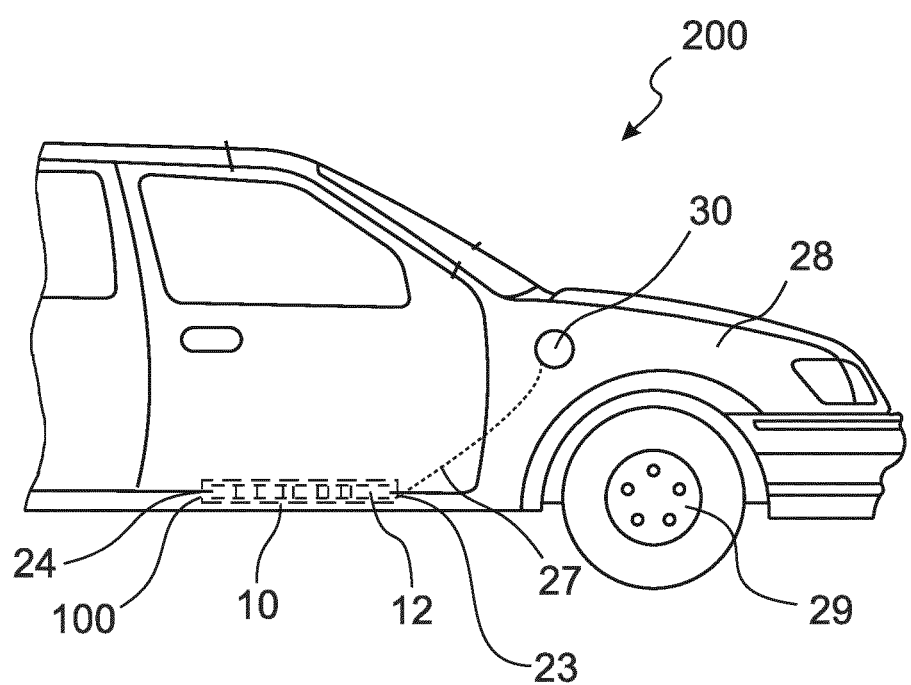
FIG. 4 is a schematic view of a hybrid vehicle according to the invention.

FIG. 1 schematically shows a battery unit 100 for a hybrid vehicle 200 as shown in FIG. 4.

The battery unit 100 has a battery housing 10 within which a plurality of battery modules 11 are arranged together with a fuel tank 12 in which liquid fuel 13 is stored. The battery housing 10 encloses the fuel tank 12 and the battery modules 11, so that both the battery modules 11 and the fuel tank 12 are arranged so as to be protected by the battery housing 10.

The fuel tank 12 is arranged directly adjoining one of the battery modules 11. The fuel tank 12 is arranged in a row behind the battery modules 11. The fuel tank 12 is arranged in a pack with the battery modules 11.

In contrast to the embodiment shown here, it is also possible for battery modules 11 not only to be arranged one behind the other, but also so as to be stacked one next to the other and/or one on top of the other. Furthermore, it is also possible that not only one fuel tank 12 is arranged in the battery housing 10, but instead two or more fuel tanks 12 can also be arranged in the battery housing 10, which can then be arranged so as to be stacked one behind the other and/or one on top of the other and/or one next to the other.

As can be seen in FIG. 1, the fuel tank 12 has an outer contour which is adapted to the outer contour of the battery modules 11. Both the battery modules 11 and the fuel tank 12 are rectangular or box-shaped. The fuel tank 12 has the same length and the same height as the battery modules 11. The fuel tank 12 and the battery modules 11 differ from one another in their external dimensions only with regard to the width, the fuel tank 12 having a greater width than the individual battery modules 11 in the embodiment shown here.

The battery modules 11 each have a housing in which a plurality of battery cells are preferably arranged, which are not shown here. The battery modules 11 are used to provide the hybrid vehicle 200 with electrical energy for electrically driving the hybrid vehicle 200.

The fuel tank 12 stores liquid fuel, such as gasoline, for driving the hybrid vehicle 200 by means of the internal combustion engine.

The fuel tank 12 is formed from a plastics material, wherein it is possible for the fuel tank 12 to be produced in an injection molding process. Because the fuel tank 12 is protected by the battery housing 10, the fuel tank 12 can be formed from a plastics material which, in particular, has a low impact strength or impact resistance.

Figure 3:
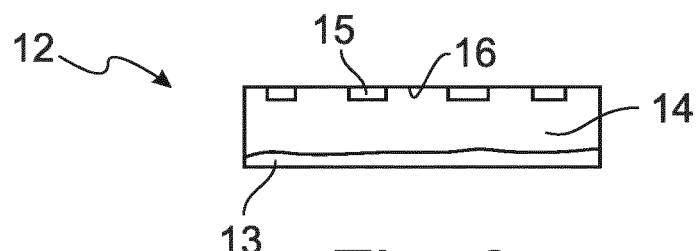
FIG. 3 is a schematic sectional view of a fuel tank according to the invention.

The fuel tank 12 is designed as a pressure tank. To stabilize the fuel tank 12, in particular against underpressure, the fuel tank 12, as can be seen in the sectional view in FIG. 3, comprises a plurality of indentations or ribs 15 directed towards the interior 14 of the fuel tank 12, which indentations or ribs are formed or arranged on an inside 16 of the fuel tank 12 directed towards the interior 14.

Figure 2:
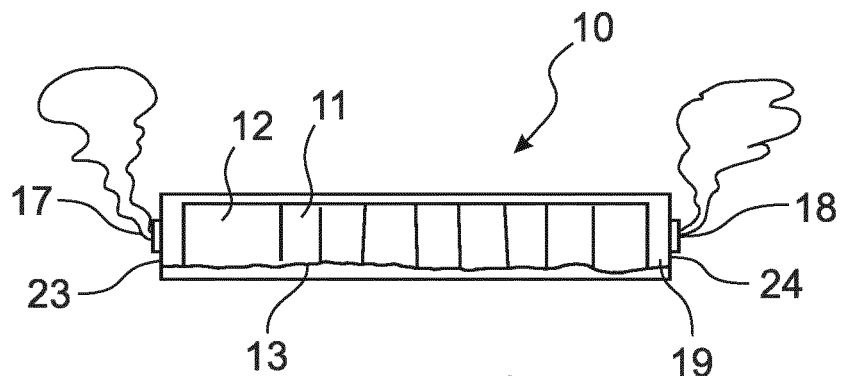
FIG. 2 is a schematic sectional view of a battery housing according to the invention.

As shown in FIG. 2, the battery housing (10) has two degassing openings 17, 18, via which pressure equalization between an interior 19 of the battery housing 10 and outside of the battery housing 10 can take place. In the embodiment shown in FIG. 2, the battery housing 10 has two degassing openings 17, 18, wherein the first degassing opening 17 is arranged on the front side wall 23 of the battery housing 10 and the second degassing opening 18 is arranged on the rear side wall 24 of the battery housing 10.

The degassing openings 17, 18 on the battery housing 10 are closed by means of a semipermeable membrane 22 which allows gas such as air to pass through and blocks liquids so that no liquid can enter or exit the battery housing 10 via the degassing openings 17, 18.

In the event of a rise in the temperature in the fuel tank 12 and/or in the battery modules 11 and thereby in the battery housing 10, gas, in particular air, can escape via the degassing openings 17, 18. If the temperature rises very sharply, fuel 13 can flow from the fuel tank 12 into the interior 19 of the battery housing 10, as is indicated schematically in FIG. 2, and can ignite on the battery modules 11. The gases produced in the process can escape in a controlled manner via the degassing openings 17, 18 of the battery housing 10. By arranging a degassing opening 17 on the front side wall 23 and a degassing opening 18 on the rear side wall 24 of the battery housing 10, the gas can escape at a distance away from the vehicle doors of the hybrid vehicle 200. In the event of an accident, this simplifies vehicle occupants getting out and/or being rescued, and the risk of injury to the vehicle occupants from hot, escaping gas can be reduced. Due to the special positioning of the degassing openings 17, 18 on the battery housing 10, the risk of fuel 13 leaking out of the interior 19 of the battery housing 10 in the event of the hybrid vehicle 200 overturning can also be reduced or even prevented.

Inside the battery housing 10, the fuel tank 12 is arranged immediately adjacent to or adjoining the front side wall 23 of the battery housing 10, so that the fuel tank 12 is arranged at the front in the direction of travel of the hybrid vehicle 200 marked with the arrow. Starting from the front side wall 23 of the battery housing 10, the battery modules 11 are arranged behind the fuel tank 12.

A fuel line 25 via which fuel can be fed from the fuel tank 12 to an internal combustion engine (not shown here) is conducted out of the battery housing 10. Furthermore, an electrical line 26 which can electrically connect the battery modules 11 to an electric motor (not shown here) within the hybrid vehicle 200 is conducted out of the battery housing 10.

In addition, a fuel filler line 27 is arranged on the battery housing 10, via which line fuel 13 can be filled into the fuel tank 12. As can be seen in FIG. 4, the fuel filler line 27 shown here by dashed lines is connected to a tank filler neck 30 which is arranged on a fender 28 of a front wheel 29 of the hybrid vehicle 200 and via which the fuel tank 12 can be refueled with fuel 13.

LIST OF REFERENCE SIGNS

100 Battery unit
200 Hybrid vehicle
10 Battery housing
11 Battery module
12 Fuel tank
13 Fuel
14 Interior
15 Indentation/rib
16 Inside
17 Degassing opening
18 Degassing opening
19 Interior
22 Semipermeable membrane
23 Front side wall
24 Rear side wall
25 Fuel line
26 Electrical line
27 Fuel filler line
28 Fender
29 Front wheel
30 Tank filler neck

The invention claimed is:

1. A battery unit for a hybrid vehicle, comprising a battery housing which has a front side wall directed towards the front side of the hybrid vehicle and a rear side wall directed towards the rear side of the hybrid vehicle, and comprising at least one battery module which is arranged in the battery housing, wherein at least one fuel tank is arranged in the battery housing, wherein the battery housing completely encloses the fuel tank together with the at least one battery module, characterized in that the battery housing has at least one degassing opening for controlled pressure reduction in an interior of the battery housing.

2. The battery unit according to claim 1, wherein the at least one fuel tank is made from a plastics material.

3. The battery unit according to claim 2, wherein the at least one fuel tank is produced in an injection molding process or in a blow molding process.

4. The battery unit according to claim 1, wherein the at least one fuel tank is arranged in a row behind the at least one battery module.

5. The battery unit according to claim 1, wherein the at least one fuel tank has an outer contour which is adapted to an outer contour of the at least one battery module.

6. The battery unit according to claim 1, wherein the at least one fuel tank is designed as a pressure tank.

7. The battery unit according to claim 1, wherein the at least one fuel tank has one or more indentations formed in the direction of an interior of the fuel tank and/or one or more ribs formed on an inside of the fuel tank.

8. The battery unit according to claim 1, wherein the battery housing has a first degassing opening and a second degassing opening, wherein the first degassing opening is arranged on the front side wall of the battery housing and the second degassing opening is arranged on the rear side wall of the battery housing.

9. The battery unit according to claim 1, wherein the at least one degassing opening has a semipermeable membrane.

10. The battery unit according to claim 1, wherein the at least one fuel tank is arranged in the battery housing adjacent to the front side wall.

11. The battery unit according to claim 1, wherein an activated carbon filter is arranged in the battery housing.

12. The battery unit according to claim 1, wherein two or more fuel tanks are arranged in the battery housing, which are arranged so as to be stacked one behind the other and/or one on top of the other and/or one next to the other.

13. A hybrid vehicle, comprising a battery unit designed according to claim 1.

14. The hybrid vehicle according to claim 13, characterized in that a tank filler neck is arranged on a fender of a front wheel or a rear wheel of the hybrid vehicle, which tank filler neck is connected via a fuel filler line to the fuel tank in the battery housing of the battery unit.

* * * * *